Dec. 26, 1967    H. H. KHALIL    3,359,974
DEVICE FOR THE THERMAL DETERMINATION
OF CARDIAC VOLUMETRIC PERFORMANCE
Filed Oct. 7, 1963    4 Sheets-Sheet 1
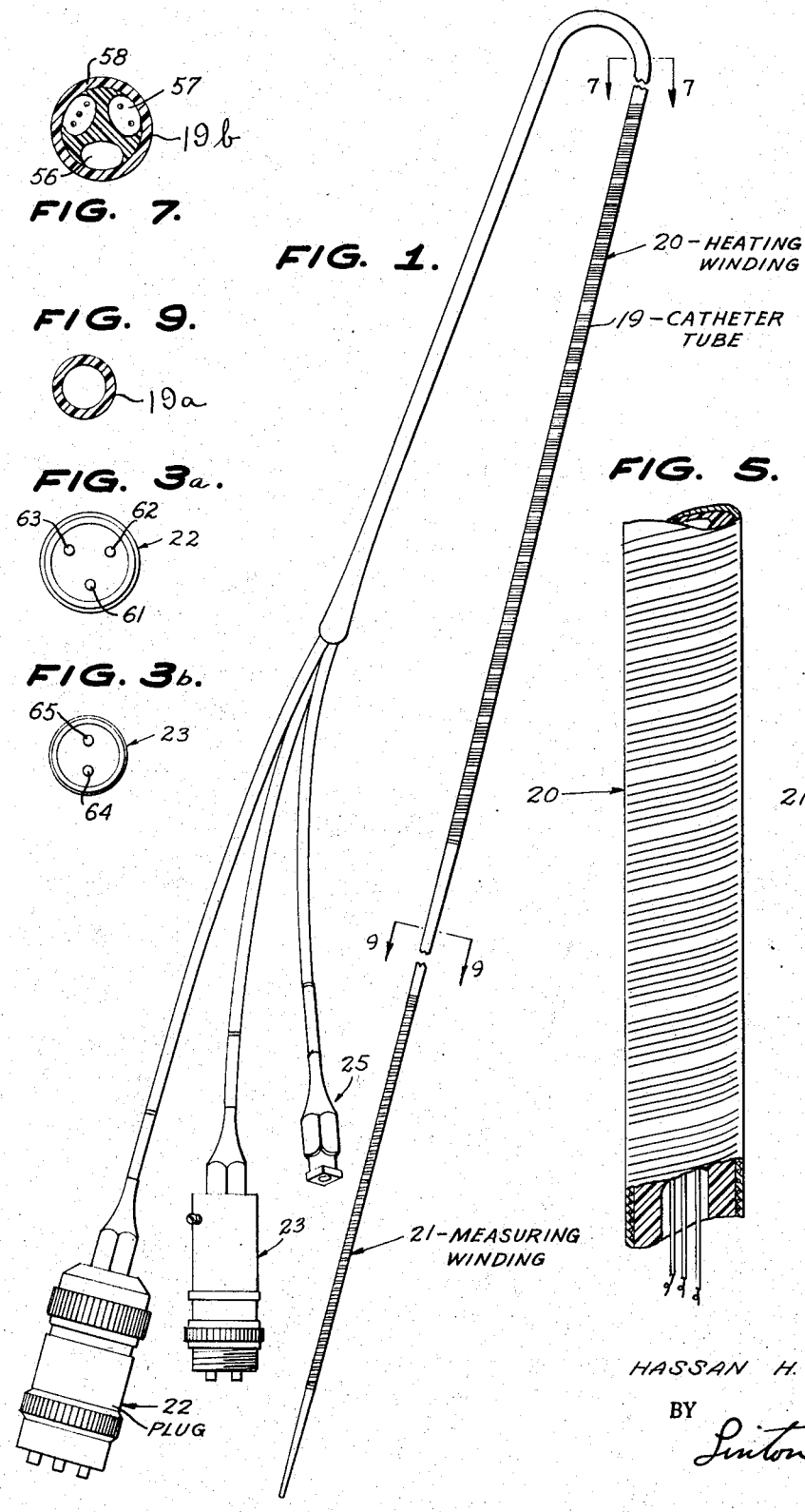
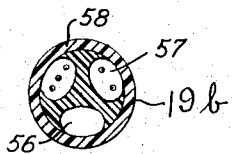
FIG. 7.
FIG. 9.
FIG. 3a.
FIG. 3b.
FIG. 1.
FIG. 5.
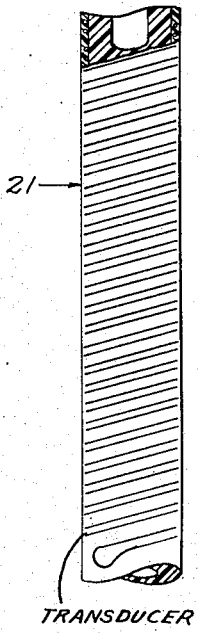
FIG. 6.
INVENTOR.
HASSAN H. KHALIL,
BY
*Linton and Linton*
ATTORNEYS.

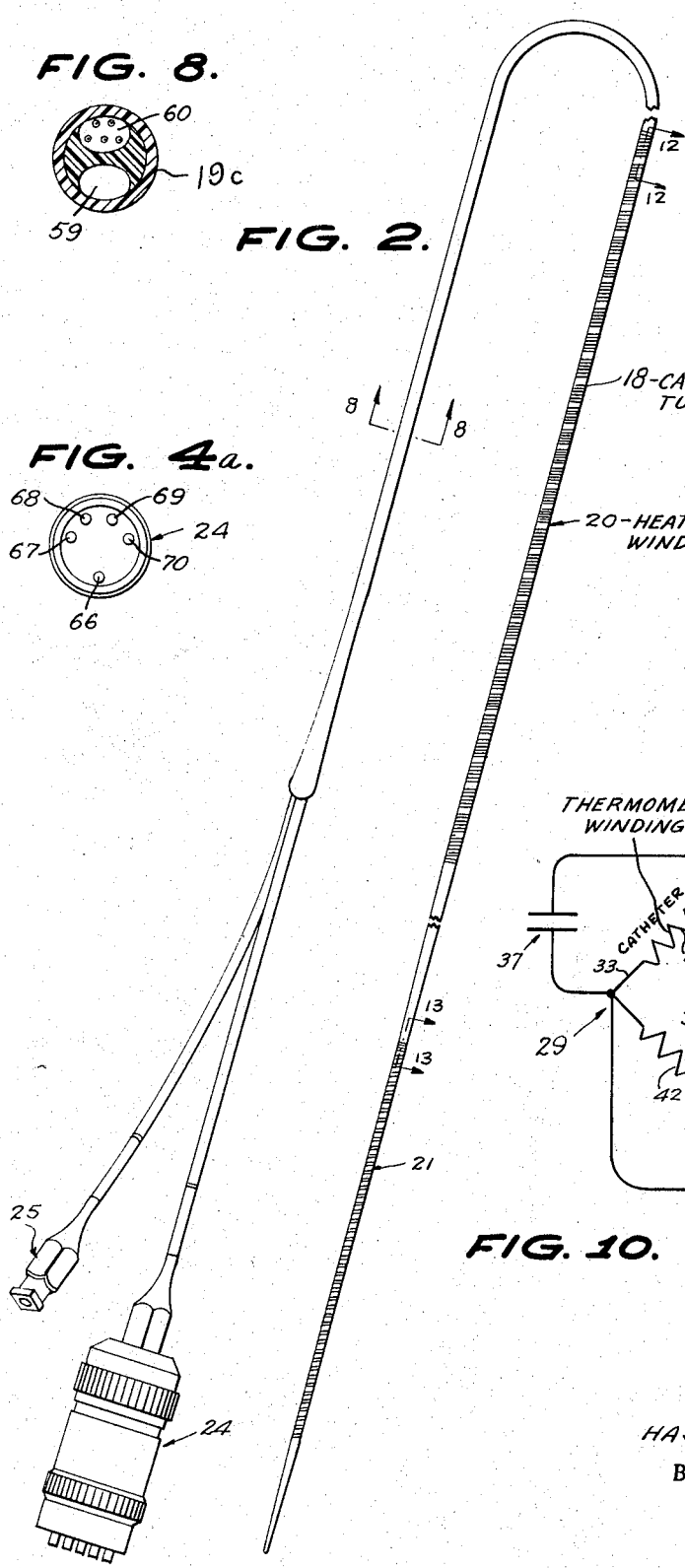
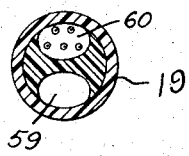
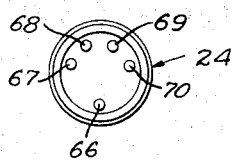
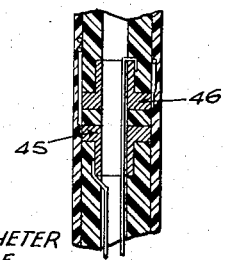
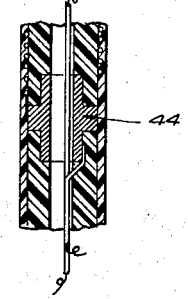
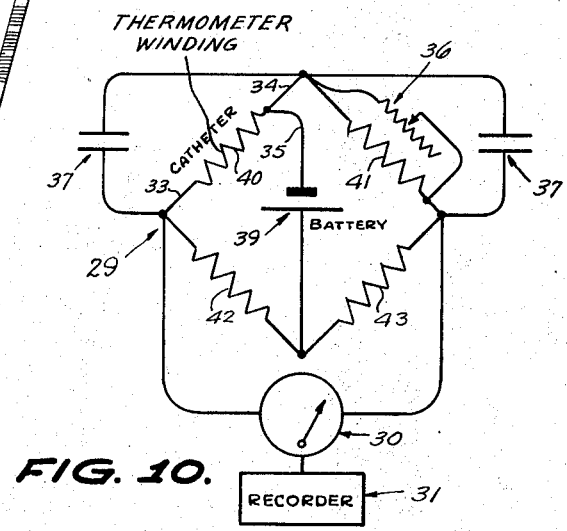

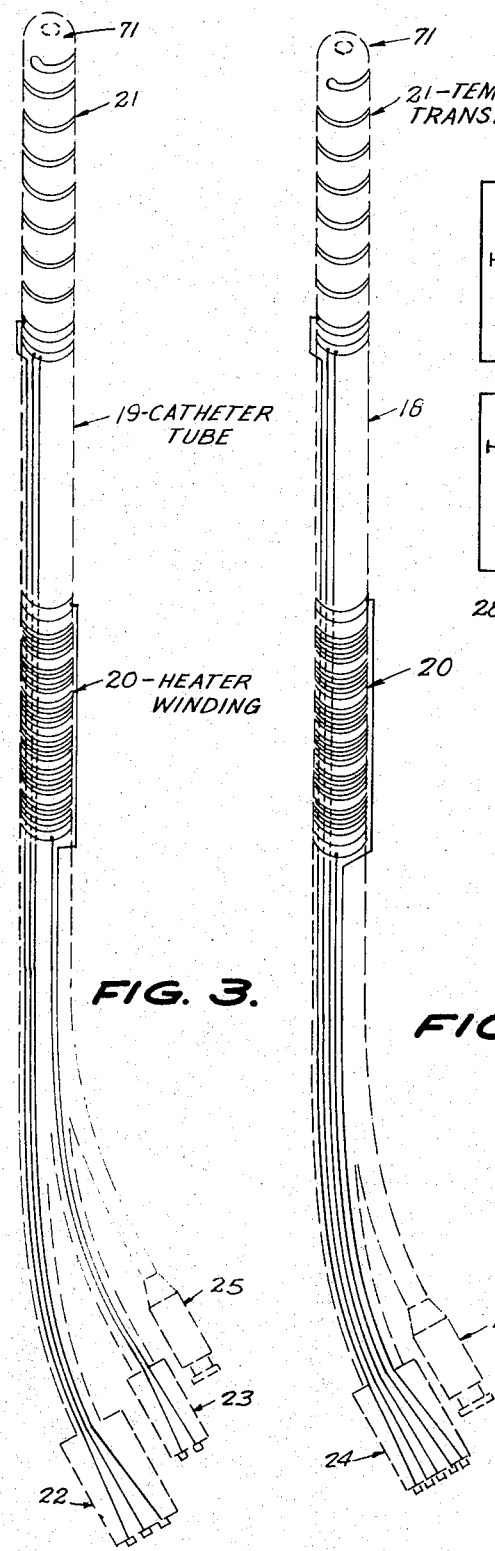
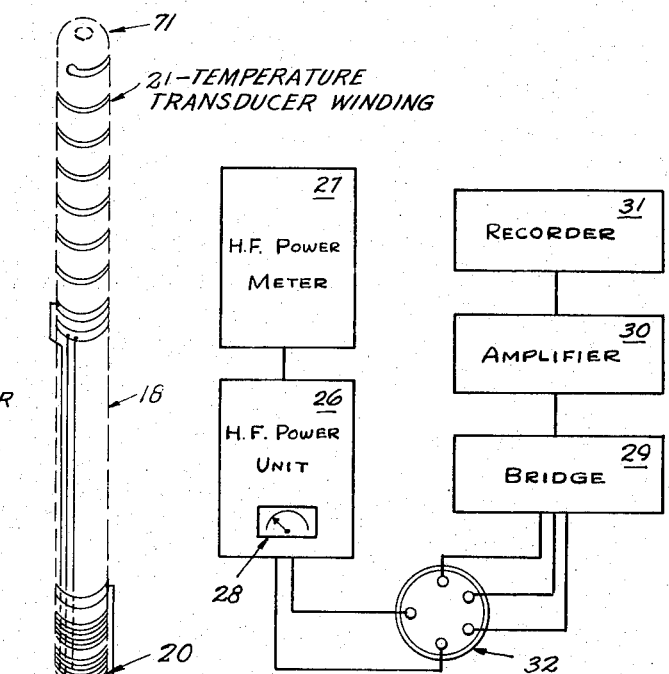
FIG. 3.  FIG. 4.  FIG. 11.

Dec. 26, 1967     H. H. KHALIL     3,359,974
DEVICE FOR THE THERMAL DETERMINATION
OF CARDIAC VOLUMETRIC PERFORMANCE
Filed Oct. 7, 1963     4 Sheets-Sheet 4

INVENTOR
HASSAN H. KHALIL
BY *Linton and Linton*
ATTORNEYS

United States Patent Office 3,359,974
Patented Dec. 26, 1967

3,359,974
DEVICE FOR THE THERMAL DETERMINATION
OF CARDIAC VOLUMETRIC PERFORMANCE
Hassan H. Khalil, University of Mississippi Medical
Center, Jackson, Miss. 39216
Filed Oct. 7, 1963, Ser. No. 314,260
5 Claims. (Cl. 128—2.05)

The present invention is concerned with a device for the thermal determination of cardiac volumetric performance.

The principal object of the present invention is to provide a method and means for measuring the cardiac output of blood flow per minute, both when the subject is at rest and when under exertion, as a tool in cardiovascular research and clinical diagnosis which permits the accurate, rapid, successive determinations of cardiac volumetric output performance per unit of time in men or animals, while at rest, while exercising or even during major surgery, with simplicity, safety and with minimal inconvenience to the subject.

Further objects of the present invention will be in part obvious and in part pointed out in the following description of the accompanying drawings, in which:

FIGURE 1 is a general schematic view of the present invention when constructed on a tri-lumen cardiac catheter.

FIGURE 2 is a general schematic view of the invention when constructed on a bi-lumen cardiac catheter.

FIGURE 3 shows details of the present invention constructed on a tri-lumen cardiac catheter including the windings.

FIGURE 3a shows a three terminal plug for connecting the thermometer winding.

FIGURE 3b shows a two terminal plug for connecting the heater winding.

FIGURE 4 shows details of the present invention constructed on a bi-lumen cardiac catheter including the windings.

FIGURE 4a shows a five terminal plug for connecting the thermometer and heater windings.

FIGURE 5 is a schematic representation of the heater coil winding employed to introduce heat, by means of high-frequency current, into the blood flowing through the heart.

FIGURE 6 is a schematic representation of the temperature measurement transducer, which constitutes one limb of a specially designed Wheatstone bridge.

FIGURE 7 is a sectional view through a tri-lumen cardiac catheter as constructed in accordance with the present invention taken on line 7—7 of FIG. 1.

FIGURE 8 is a sectional view through a bi-lumen cardiac catheter as constructed according to the present invention taken on line 8—8 of FIG. 2.

FIGURE 9 is a sectional view through the distal part of the catheter of the present invention showing the special lumen for blood sampling and direct pressure measurements taken on line 9—9 of FIG. 1.

FIGURE 10 is a schematic representation of the electrical circuit embodying the temperature measurement transducer part of the present invention.

FIGURE 11 shows a typical arrangement of the units connected to the linking plug which makes contact with individual plugs separately or with a combined plug jointly.

Figure 14:
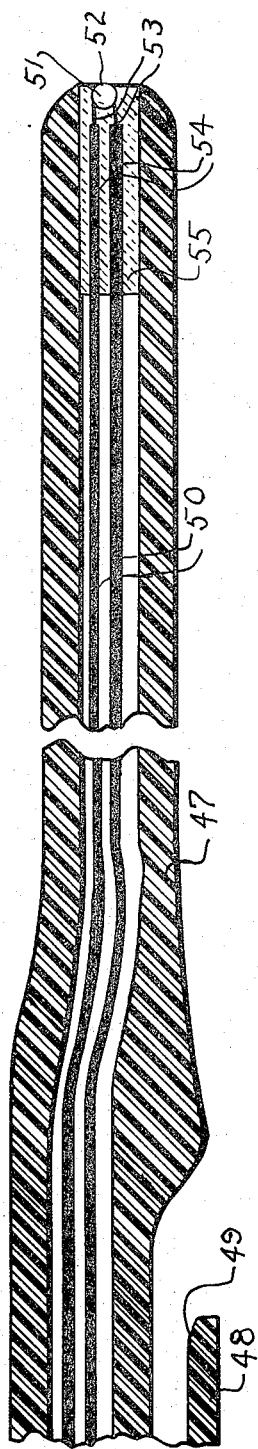

FIGURE 12 discloses an in-built silver-nickel terminal at both ends of the heater coil.

FIGURE 13 is a view of an in-built silver-nickel double terminal at the proximal end of the temperature measurement transducer, and FIG. 14 shows a modified form in which the temperature sensing element is a thermistor.

In this arrangement heat is introduced at a predetermined constant rate for a short time into the blood stream flowing through the superior, or inferior, vena cava and into the right atrium of the heart and its dilution by the blood flowing through is later measured after it has reached a subsequent point.

Referring to FIG. 1, a special heating resistance winding or coil 20 wound on a standard tri-lumen or bi-lumen flexible tube-shaped cardiac catheter 19 and heated by high-frequency alternating current is used for this purpose. Downstream to this heater coil 20, at a later point in the circulatory path, the mean temperature of blood flowing through the pulmonary artery is measured by means of a special temperature measuring transducer winding 21 that will be hereafter described.

Upon introducing heat, there is a temperature rise of the blood flowing through the pulmonary artery which is measured by this temperature measuring transducer. This rise ranges between 0.02 and 0.12° C., depending on cardiac volumetric output and the amount of heat introduced. Taking into consideration the specific heat and the specific gravity of blood, the cardiac output (milliliters per minute) which is inversely proportional to temperature rise, may then be calculated by the formula:

$$\text{Cardiac output (milliliters per min.)} = \frac{60(W \times 0.2388)}{0.905 \times S}$$

where:

60=conversion factor to obtain minute volume
$W$=rate of high frequency power in watts put into the heater
0.2388=conversion factor to express watts as calories/second
0.905=0.87×1.04 where:

0.87=the specific heat of blood when its hoematocrit is within normal limits (Mendlowitz, Science 1948)
1.04=the specific gravity of blood
$S$=rise of the mean temperature of blood flowing through the pulmonary artery in degrees centigrade.

This formula is based on recognized thermodynamic principles and was published by applicant in "The Lancet," June 23, 1963, page 1354. Also by A. Fick, in a paper in 1868, of which a translation appears in New England Journal of Medicine, v. 239, page 120, 1948.

The following assembly is built up on a standard tri-lumen (FIGS. 1 and 3) or bi-lumen (FIGS. 2 and 4) cardiac catheter of flexible tube shape, size 7, 8 or 9F. Five "Formvar" insulated copper wires, No. 34, are passed through two lumens of the tri-lumen or one lumen of the bi-lumen cardiac catheter 18 (FIGS. 1, 2, 3 and 4), to make connection with a heater winding or coil 20 and with a fine wire temperature transducer 21. "Formvar" is a trademark designation of a special insulating coating material alloy. One lumen of either type catheter (FIG. 9) is left free for blood sampling or direct pressure measurements or for the introduction of drugs into the blood stream via the catheter.

Referring particularly to FIG. 2, the heater winding or coil 20 varies in length from 12–15 centimeters, depending on the size of the heart to be investigated. It is wound on the flexible tubular cardiac catheter tube 18 at such distance from the catheter's tip 71 that the coil will be partly in the right atrium and partly in the superior (or inferior) vena cava when the distal segment of the catheter lies in the main pulmonary trunk and its right or left main branches. The heater coil 20 consists of six fine enamel or polyurethane insulated constantan wires No. 45 (resistivity approximately 300 ohms per meter) tightly wound in parallel around the tubular cardiac catheter tube 18. At each end of the coil, the wires are soldered to an in-built terminal (FIG. 12) which, in turn, is connected to one of the copper wires inside the lumen of the cardiac catheter tube and leading to the connecting plug 22 or 24. It is possible to dispense with the particular terminals as shown and simply solder the six constantan wires directly to the flattened tips of the copper wire leads as they emerge from the catheter. The heating coil 20 is then fixed to the cardiac catheter tube 18 by coating the tubular catheter and coil with a thin flexible layer of polyurethane, the same material used in the manufacture of standard cardiac catheters as heretofore known. This coating, in addition to anchoring the coil thoroughly, insulates the terminals or the flattened tips of the emerging copper leads. However, for increased mechanical durability, the two terminals are coated with an inflexible epoxy resin. The heater coil resistance as used is approximately 50 ohms, which is equal to the impedance of a high-frequency power meter 27 shown in the circuit. A heater coil of lower or higher total resistance might be used as long as its resistance matches the impedance of the particular high-frequency power meter used.

To apply heat, high-frequency alternating current is applied to the heater coil winding 20. The purpose of using high-frequency current is to avoid the risk of electrical stimulation of the myocardium which might be caused by a commercial frequency. A frequency of 340 kilocycles per second has been used in pilot models and has been found to be satisfactory. However, it is not essential to use this exact frequency. The circuit shown in FIG. 11 is so arranged that either the watt meter 27 or the heater coil 20 may be connected to the high-frequency power unit. The purpose of including this high-frequency power meter in the circuit is to determine the rate of heating prior to applying the electric power to the catheter. Another high-frequency power meter 28 is included in the circuit and it measures the power actually being supplied to the heater coil. This second high-frequency power meter 28 may be checked by the first high-frequency power meter 27.

A heater winding or coil 20 composed of several fine constantan wires wound in parallel around the catheter is preferred for the following reasons:

(1) Constantan has an extremely low temperature coefficient of resistivity at body temperature ($a=0.000002$). Hence the resistance of the heater coil remains essentially constant during the application of heat and accordingly the rate of heat dissipation will remain the same as predetermined.

(2) A heater coil made of multiple fine wires does not materially interfere with the normal flexibility of the standard cardiac catheter. This is essential in order to permit easy and safe manipulation of the catheter through the veins and into the greater vessels.

(3) Heat dissipation from multiple fine wires does not affect the immediately surrounding endocardium as much as if it were emerging from a smaller number of heavier ones. By using several fine wires in parallel, it was possible to obtain a more even dissipation of heat from the relatively large number of turns employed (444 turns in the present case) as well as a high resistance coil.

The number of wires wound in parallel and the length of the tubular catheter over which the coil is wound may be increased or decreased according to the size of the heart to be investigated. Other metals or alloys whose temperature coefficient of resistivity is extremely low at body temperature would function just as well as constantan; such as, for example, Manganin (Cu 84%, Mn 12% and Ni 4%).

The temperature measuring transducer here employed is a device based on well known resistance thermometry principles but with special features which make it suitable for temperature measurements inside the heart, pulmonary arteries and other blood vessels. It consists of a copper resistance thermometer winding in the form of an enamel insulated fine copper wire 21 size No. 44 in a bi-filar winding over the distal 8 to 10 centimeters of the flexible tubular cardiac catheter, beginning at the in-built silver-nickel double terminals 45, 46 (FIG. 13) to which each end is soldered separately, 10 to 12 centimeters downstream from the end of the previously described heater coil 20, and ending 2 to 3 centimeters before the tip 71 of the catheter. The distance between adjacent ends of the heater winding or coil and the temperature measuring winding is long enough to permit adequate mixing of the blood in the right ventricle and proximal part of the pulmonary artery. This bi-filar coil 21 is also fixed to the cardiac catheter tube and its terminals (FIG. 13) insulated by a thin, flexible polyurethane coating. The terminals are coated with inflexible epoxy resin. Fine insulated copper wire is used as a temperature measuring transducer winding because electrolytic copper has a relatively low strain coefficient of resistivity and a relatively high temperature coefficient of resistivity (0.0041 ohm/degree C.).

Earlier trials with platinum and later with nickel wires revealed that the high strain coefficient of resistivity, such as these metals have, interfered with accurate temperature measurements. These two metals, however, make an ideal temperature transducer if connected in series in such a manner that the negative strain coefficient of resistivity of nickel wire would cancel the positive strain coefficient of resistivity of platinum.

The purpose of extending the winding 21 of the resistance thermometer over a relatively long segment of the tubular cardiac catheter (8 to 10 centimeters) is to obtain by this means the true mean temperature of the blood flowing through the pulmonary arteries or other vessels in which the catheter is placed. Earlier attempts at such temperature measurement with thermocouples showed fluctuations in observed temperature presumably due to laminar flow or incomplete mixing of blood flowing through the pulmonary arteries. The purpose of winding the thermometer winding in a bi-filar manner is to reduce its inductive reactance to practically zero in order to avoid possible current pick-up from the heater coil or from the electrical activity of the heart. The true mean temperature of blood flowing in the pulmonary arteries and the temperature rise on applying heat by heating coil 20 is measured and recorded by connecting this resistance thermometer winding 21 and 40 through plugs 24 and 32 (FIGS. 3, 4, and 11) to a three-lead thermometer bridge 29 (FIG. 10), if a wire coil is used, or to an ordinary bridge if a thermistor is used, which is in turn connected to a direct current amplifier 30 and recorder 31.

The following special type of Wheatstone bridge is used with a wire wound temperature sensing resistance:

(1) In FIG 10, the thermometer winding or coil 40 or 21 is connected to the rest of the bridge through three separate or independent leads inside the catheter tube 33, 34, and 35. This was found to be necessary because the copper leads must pass through inside the catheter tube beneath the heater winding or coil 20, and during heating a certain amount of heat is absorbed by these leads causing a small increase in their resistance. If the thermometer coil or winding 40 or 21 had only two leads, any change in their resistance would be amplified and registered by the recorder and would be indistinguishable from a change in the resistance of the thermometer coil. By connecting lead 35 directly from battery 39 to one end of the thermometer coil or winding 40 or 21, the resistance of one of the thermometer leads is effectively transferred to the opposite side of the bridge, and since the resistances of coils or windings 40 and 41 are equal, this error is avoided because on heating, both leads 33 and 34 will experience the same change in resistance due to heat adsorption and since one lead is connected to one side of the bridge and the other to the opposite side of the bridge, the changes in resistance will balance, and no deflection will occur in the recorder. The resistors 42 and 43 are also equal to each other and form the remaining two limbs of the bridge. A 1.5 volt battery 39 is connected as shown in FIG. 10.

(2) Two filter condensers 37 (0.47 microfarad each) are included in the bridge circuit of FIG. 10. These two condensers filter out any high-frequency current picked up by the resistance thermometer winding and its leads. This stabilizes the base line during the application of high-frequency current and avoids artifacts at the start and end of heating.

The catheter heater winding 20 might possibly be operated by direct current or ordinary 50–60 c./s. commercial power line current. In this latter case, however, any failure or defect in the insulation of the heater coil might result in stimulation of the myocardium with ensuing arrhythmias or even fibrillation. This way of operating the catheter is therefore suitable for use only in experimental animals, if at all.

The present invention is also well adapted to measuring left cardiac volumetric output, however, in this case the positions of the heater coil and temperature transducer should be reversed and the catheter introduced through one of the peripheral arteries, such as the femoral artery, and advanced to the left ventricle or ascending aorta. Also the catheter is well adapted to measuring blood flow elsewhere in the body.

FIG. 14 shows the distal segment of a catheter 47 with a thermistor bead 51. An open lumen 49 has a wall 48. A wire loop 50 preferably of No. 34 wire is positioned in the channel in the catheter. The thermistor 52 has preferably a diameter of 0.015–0.02 inch. The thermistor leads are silver soldered to the lead wires at 53. A cross hatched area of the catheter shown at 55 is filled with encapsulating material.

A suitable length from the thermistor bead to the open end of wall 48 is twelve centimeters.

In this case, however, only an ordinary two lead thermometer bridge is required since both the resistance of the thermistor (1500 ohms) and its temperature coefficient of resistivity are so high that minor changes in the resistance of its leads will have negligible effect on the measurement. With the thermistor, a four terminal plug, two for the bridge and two for high frequency power will suffice, instead of the five terminal plug.

It is thus seen that there has been constructed a novel cardiac measuring catheter that provides a simple method of performing extensive diagnostic and investigative studies on heart functions by successive determinations of right cardiac volumetric output at rest, during exertion, after administration of drugs, and during major surgery, with simplicity, safety and reliability.

I claim:

1. A cardiac catheter arrangement for measuring the volume of the blood delivered by the heart, consisting of a flexible tubular catheter member adapted to be introduced into a blood vessel, a heater wire winding wound on said member, a thermometric winding wound on said member at a separate substantially spaced downstream position thereon, relative to said heater winding, the adjacent ends of said two windings being substantially spaced apart, first connections for supplying at a constant rate high-frequency heating current at short intervals to said heater winding, second connections connected to said measuring winding, and a measuring bridge circuit connected to said second connections said heater winding being relatively long in comparison with the length of said catheter member and of the order of 12 centimeters said measuring bridge circuit being a three-lead bridge circuit having a first pair of resistance arms of substantially equal resistance and having a second pair of resistance arms one of which is said thermometric measuring winding and the other arm of said second pair being a winding of resistance equal to the resistance of said thermometric measuring winding, a first lead connected from the terminal of a first one of said first pair of arms which is not connected to a terminal of the second one of said first pair of arms, to a first terminal of said thermometric measuring winding which is not connected to a terminal of said other arm of said second pair of arms, a second lead connected from the second other terminal of said thermometric winding to a first terminal of the second one of said second pair of arms whose resistance is equal to the resistance of said thermometric measuring winding, a battery, and a third lead connected directly from a first pole of said battery to said second other terminal of said thermometric winding, and the second other pole of said battery being connected to the common point of the two arms of said first pair of arms, and the second other terminal of the second one of said second pair of arms being connected to the terminal of the second one of said first pair of arms which is not connected to the first one of said first pair of arms.

2. A cardiac catheter arrangement for measuring the volume of the blood delivered by the heart, consisting of a flexible tubular catheter member adapted to be introduced into a blood vessel, a heater wire winding wound on said member, a thermometric measuring winding wound on said member at a separate substantially spaced downstream position thereon, relative to said heater winding, the adjacent ends of said two windings being substantially spaced apart, first connections for supplying at a constant rate high-frequency heating current at short intervals to said heater winding, second connections connected to said measuring winding, and a measuring bridge circuit connected to said second connections said heater winding being relatively long in comparison with the length of said catheter member and of the order of 12 centimeters, and said measuring winding being relatively long in comparison with the length of said catheter member and of the order of 10 centimeters said measuring bridge circuit being a three-lead bridge circuit having a first pair of resistance arms of substantially equal resistance and having a second pair of resistance arms one of which is said thermometric measuring winding, and the other arm of said second pair being a winding of resistance equal to the resistance of said thermometric measuring winding, a first lead connected from the terminal of a first one of said first pair of arms which is not connected to a terminal of the second one of said first pair of arms, to a first terminal of said thermometric measuring winding which is not connected to a terminal of said other arm of said second pair of arms, a second lead connected from the second other terminal of said thermometric winding to a first terminal of the second one of said second pair of arms whose resistance is equal to the resistance of said thermometric measuring winding, a battery, and a third lead connected directly from a first pole of said battery to said second other terminal of said thermometric winding, and the second other pole of said battery being connected to the common point of the two arms of said first pair of arms, and the second other terminal of the second one of said second pair of arms being connected to the terminal of the second one of said first pair of arms which is not connected to the said first one of said first pair of arms, and a first high-frequency filter connected from the end of said second lead which is not directly connected to said thermometric winding, to the first terminal of said second one of said first pair of arms and which is not connected to the first one of said first pair of arms, and a second high-frequency filter connected from the end of the said second lead which is not directly connected to said thermometric measuring winding of said two windings constituting said second pair of arms, to the terminal of said first arm of said first pair of arms which is not connected to the second one of said first pair of arms.

3. An arrangement according to claim 1, said measuring winding consisting of two wires connected in series one of which has a negative strain coefficient of resistivity, and the other wire being platinum.

4. The method of measuring cardiac volumetric output of blood using a flexible cardiac arterial catheter having two spaced wire windings thereon of substantial length of the order of 10 centimeters which consists in introducing the catheter into an artery with a first winding thereon close to the heart, passing a constant determined high-frequency current through said first winding for a series of relatively short regular intervals of time, introducing said second winding into said artery at a point substantially downstream of the blood stream from said first winding, and electrically measuring the temperature of the blood flowing over the second temperature sensing winding by measuring the change of its resistance as the heating current is applied to and removed from said first winding.

5. A cardiac catheter arrangement for measuring the volume of the blood delivered by the heart, consisting of a flexible tubular catheter member adapted to be introduced into a blood vessel, a heater wire winding wound on said member, a thermometric measuring winding wound on said member at a separate substantially spaced downstream position thereon, relative to said heater winding, the adjacent ends of said two windings being substantially spaced apart, first connections for supplying at a constant rate high-frequency heating current at short intervals to said heater winding, second connections connected to said measuring winding, and a measuring bridge circuit connected to said second connections, said heater winding being relatively long in comparison with the length of said catheter member and of the order of 12 centimeters, and said measuring winding being relatively long in comparison with the length of said catheter member and of the order of 10 centimeters, said bridge circuit having a first pair of resistance arms of equal resistance, and having a second pair of resistance arms one of which arms is said thermometric measuring winding and the other arm of said second pair being a winding of resistance equal to said thermometric measuring winding, and said bridge circuit having a battery connected between the common point of said first pair of arms and the end of said thermometric measuring winding most remote from said common point of said first pair of arms.

References Cited
UNITED STATES PATENTS

| | | | |
|---|---|---|---|
| 2,949,910 | 8/1960 | Brown et al. | 128—2.05 |
| 2,976,865 | 3/1961 | Shipley | 128—2.05 |
| 2,981,911 | 4/1961 | Warnick | 128—2.05 X |
| 3,033,194 | 5/1962 | Lippert | 128—2 |
| 3,075,515 | 1/1963 | Richards | 128—2.05 |
| 3,107,664 | 10/1963 | Smith | 128—2.05 |
| 3,149,627 | 9/1964 | Bagno | 128—2.1 |

RICHARD A. GAUDET, *Primary Examiner.*

SIMON BRODER, *Examiner.*